United States Patent
Sproule

(10) Patent No.: US 9,822,880 B2
(45) Date of Patent: Nov. 21, 2017

(54) WATERTIGHT SEAL DESIGN FOR VEHICLE EVAPORATOR TUBES AND VALVE

(71) Applicant: HALLA VISTEON CLIMATE CONTROL CORP, Daejeon (KR)

(72) Inventor: Michael Herbert Sproule, Brighton, MI (US)

(73) Assignee: HANON SYSTEMS, Daejeon-si (KR)

( * ) Notice: Subject to any disclaimer, the term of this patent is extended or adjusted under 35 U.S.C. 154(b) by 317 days.

(21) Appl. No.: 14/484,405

(22) Filed: Sep. 12, 2014

(65) Prior Publication Data
US 2016/0075209 A1 Mar. 17, 2016

(51) Int. Cl.
*F16J 15/08* (2006.01)
*F16J 15/10* (2006.01)
*B60H 1/00* (2006.01)

(52) U.S. Cl.
CPC ........ *F16J 15/102* (2013.01); *B60H 1/00521* (2013.01); *F16J 15/104* (2013.01); *B60H 2001/00635* (2013.01)

(58) Field of Classification Search
CPC .......... F16J 15/02; F16J 15/021; F16J 15/022; F16J 15/06; F16J 15/061; F16J 15/102; F16J 15/104
See application file for complete search history.

(56) References Cited

U.S. PATENT DOCUMENTS

| | | | | |
|---|---|---|---|---|
| 4,813,691 A | * | 3/1989 | Schoenborn | F16J 15/0825 277/598 |
| 5,234,185 A | * | 8/1993 | Hoffman | F16L 5/14 248/56 |
| 6,003,877 A | * | 12/1999 | Martin | F02F 11/002 277/592 |
| 7,971,910 B2 | * | 7/2011 | Holt | F16L 39/00 285/13 |
| 8,430,365 B2 | * | 4/2013 | Benoit | F16L 5/027 248/49 |
| 8,468,849 B2 | * | 6/2013 | Kesler | F16L 23/0283 251/148 |
| 9,114,687 B2 | * | 8/2015 | Dorland | B60H 1/00571 |

FOREIGN PATENT DOCUMENTS

JP 2002064922 A 2/2002
JP 2411161970 A 8/2011

* cited by examiner

*Primary Examiner* — Gilbert Lee
(74) *Attorney, Agent, or Firm* — Shumaker, Loop & Kendrick, LLP

(57) ABSTRACT

A seal for a heating, ventilation, and air conditioning (HVAC) system for a motor vehicle. The seal includes a first sealing portion, a second sealing portion, and a hinge disposed intermediate the first sealing portion and the second sealing portion. The seal is configurable in an unfolded position, wherein the first sealing portion, second sealing portion, and hinge are substantially aligned, and a folded position, wherein the second sealing portion overlaps the first sealing portion.

9 Claims, 3 Drawing Sheets

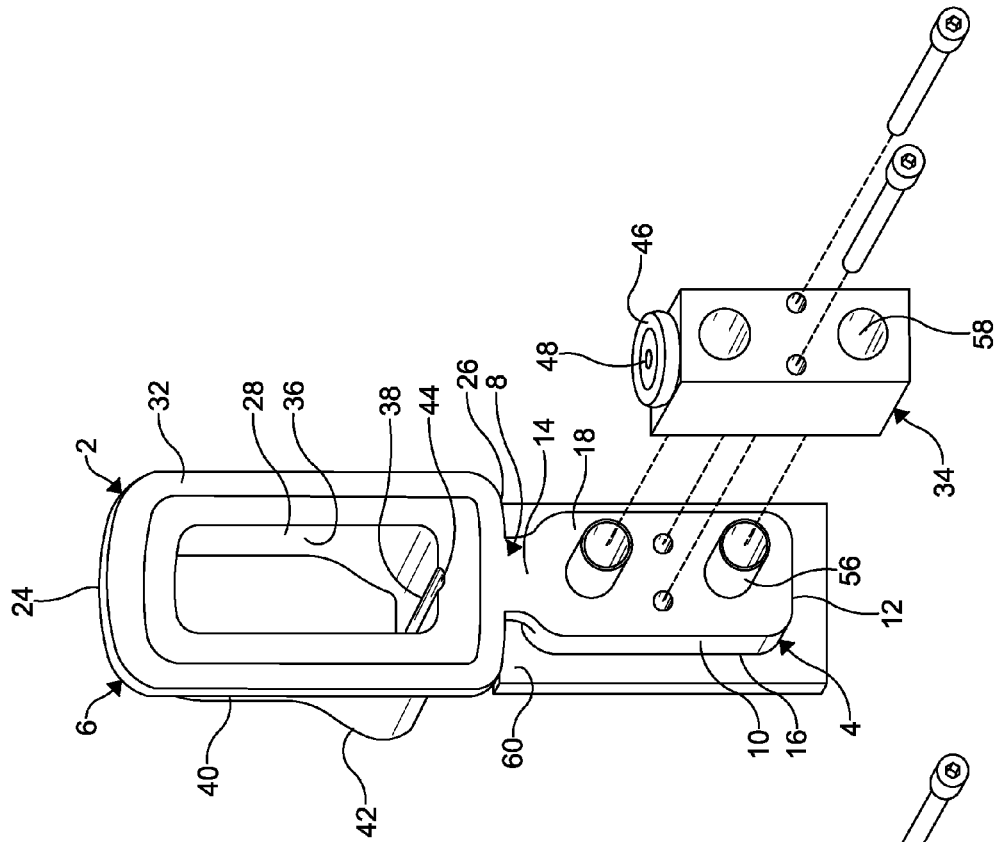
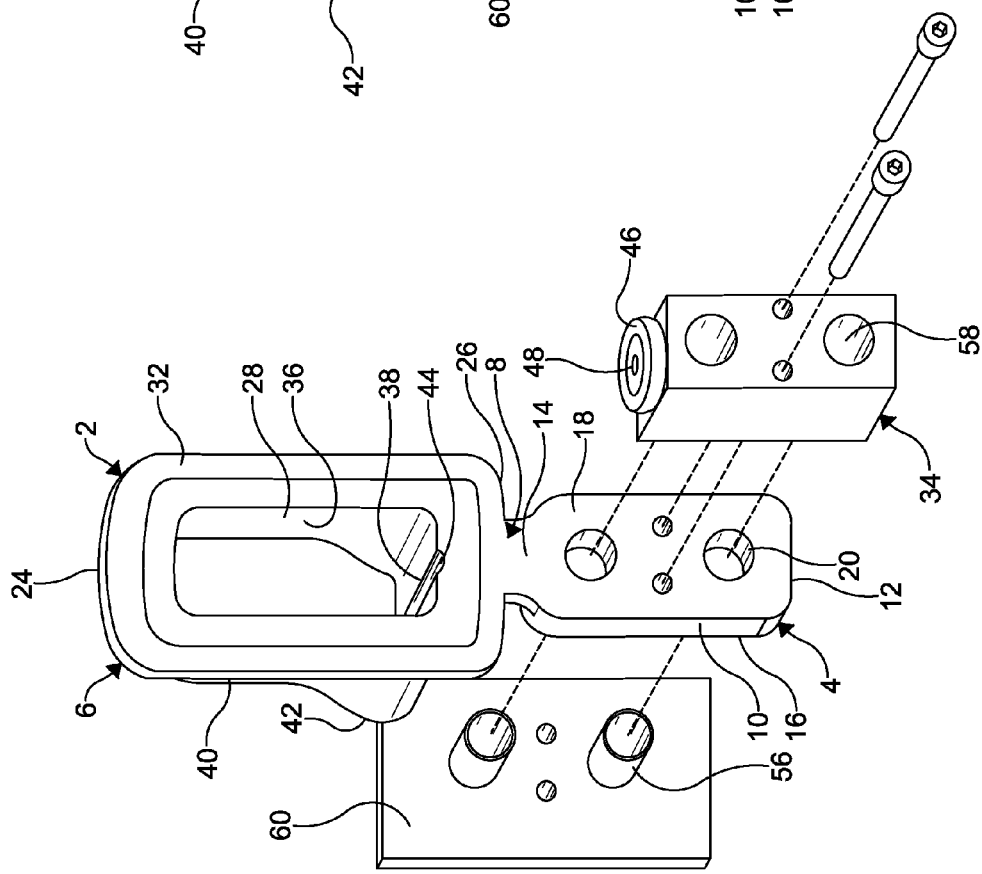

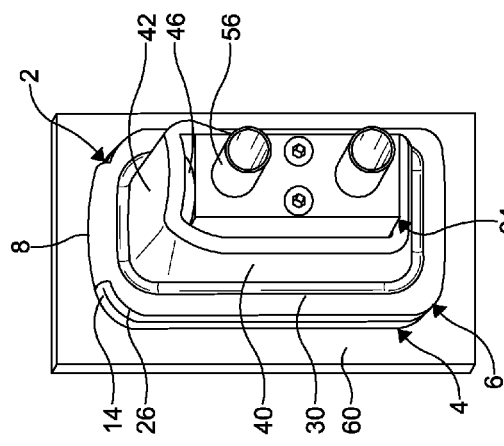
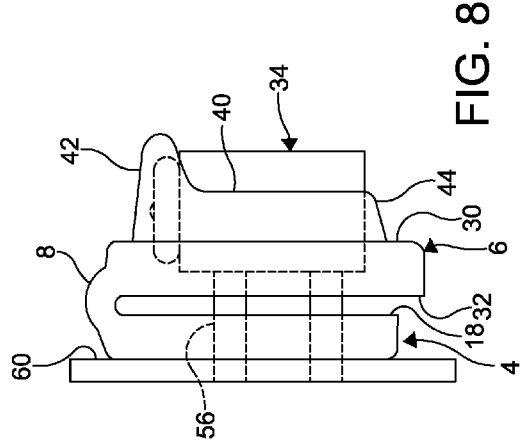
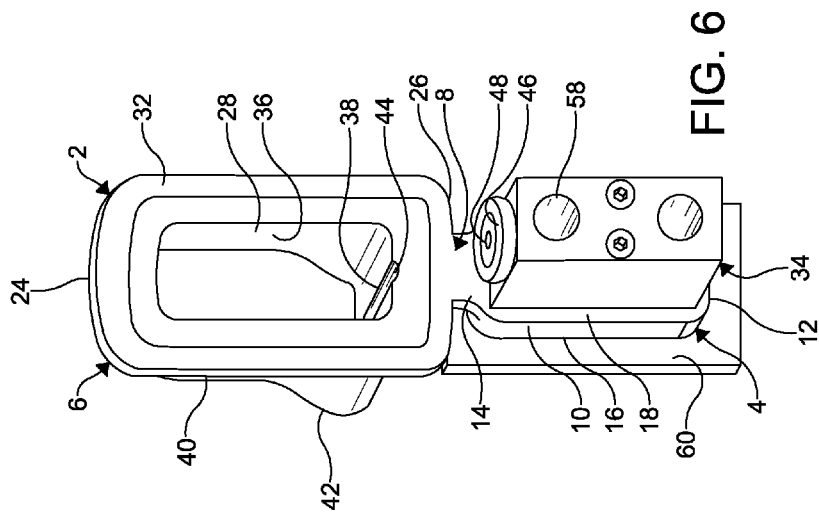

WATERTIGHT SEAL DESIGN FOR VEHICLE EVAPORATOR TUBES AND VALVE

FIELD OF THE INVENTION

The invention relates to a heating, ventilation, and air conditioning (HVAC) system for a motor vehicle and, more particularly, to a thermal expansion valve dash seal providing water ingress protection and thermal insulation in a one-piece design.

BACKGROUND OF THE INVENTION

In order to maximize passenger comfort and safety, as well as vehicle durability, it has become increasingly important to increase environmental isolation of a passenger compartment of a vehicle from an engine compartment of a vehicle. The isolation of the passenger compartment includes a need to prevent passage of environmental elements such as water, dust, air, and heat, as well as other pollutants, from the engine compartment into the passenger compartment.

However, proper design of a heating ventilation and air conditioning (HVAC) system of the vehicle requires that components of the HVAC system be located in both the engine compartment and the passenger compartment. For example, the HVAC system may include a number of system components in the engine compartment such as a condenser or a compressor, as well as components in the passenger compartment such as an evaporator.

Positioning of the system components in the engine compartment and the passenger compartment makes the task of isolating the passenger compartment from the engine compartment particularly challenging, as a number of conduits of the HVAC system must be disposed through a bulkhead intermediate the engine compartment and the passenger compartment. To provide for efficient assembly of the HVAC system within the vehicle, apertures through the bulkhead must be larger than the respective conduits that pass therethrough, providing a clearance between the conduits and the bulkhead. However, the clearance around the conduits provides for easy passage of fluids and other pollutants from the engine compartment into the passenger compartment.

To militate against the passage of the fluids and the other pollutants, seals are installed in the apertures through the bulkhead and around the conduits, thereby sealing the clearances around the conduits. To ease assembly and accommodate a dimensional variation of the system components such as between the conduits and the apertures, it is desirable to manufacture the seal out of a softer and more flexible material. However, softer materials are less resistant to the passage of fluids, and reduce sealing effectiveness compared to stiffer, less flexible seals. These competing interests require a balance between making the seal soft enough to be easily assembled, and hard enough to provide sufficient sealing effectiveness.

Further complicating the isolation of the passenger compartment is the inclusion of a thermal expansion valve in the bulkhead. The conduits of the passenger compartment and the engine compartment are typically connected through the thermal expansion valve. The thermal expansion valve controls a flow of a refrigerant through the HVAC system based on thermal input to a diaphragm disposed thereon. To prevent undesirable fluctuation in the flow of the refrigerant through the HVAC system, the diaphragm of the thermal expansion valve must be thermally insulated from temperature variations in the engine compartment.

To address these concerns, various sealing configurations for HVAC systems have been utilized. For example, a single seal may be installed around the thermal expansion valve to provide both a sealing between the passenger compartment and the engine compartment, and an insulation of the thermal expansion valve. However, the single seal configuration fails to sufficiently militate against the passage of fluids into the passenger compartment, as the seal must be formed of a softer material and provide clearance to allow easier installation of the HVAC system. In a second configuration, a stiffer secondary seal may be added behind the thermal expansion valve to improve a sealing between the passenger compartment and the engine compartment. Alternatively, a first seal may be installed behind the thermal expansion valve, while a separate cap is fitted to the diaphragm of the thermal expansion valve. The secondary seal and separate cap designs each require increased manufacturing costs, as multiple components are required to achieve sufficient sealing between the passenger compartment and the engine compartment, and the insulation of the diaphragm.

Accordingly, there is a need in the art for an economical seal for refrigerant conduits and valves in a vehicle, wherein sealing performance and reliability requirements are maximized, while also providing thermal insulation of a thermal expansion valve.

SUMMARY OF THE INVENTION

In concordance with the instant disclosure, a seal for refrigerant conduits and valves in a vehicle, wherein sealing performance and reliability are maximized, and thermal insulation of a thermal expansion valve is provided, is surprisingly discovered.

In a first embodiment, the seal includes a first sealing portion, a second sealing portion, and a hinge disposed intermediate the first sealing portion and the second sealing portion. The seal is configurable in an unfolded position, wherein the first sealing portion, second sealing portion, and hinge are substantially aligned, and in a folded position, wherein the second sealing portion overlaps the first sealing portion. The first sealing portion and the second sealing portion each include an aperture formed therethrough. The aperture of the second sealing portion is a valve aperture configured to receive a thermal expansion valve therein. The second sealing portion further includes a flange circumscribing the valve aperture of the second sealing portion, wherein the flange includes a hood for receiving a diaphragm of the thermal expansion valve. The seal may be formed from any conventional material such as a cellular polymeric material, a pure rubber material, a blended rubber material, an EPDM foam, a polyurethane foam, and a nitrile-butadiene rubber, for example.

In another embodiment, the seal includes a first sealing portion, a second sealing portion, and a hinge disposed intermediate the first sealing portion and the second sealing portion. The first sealing portion includes a sealing surface, an opposing surface, and an aperture formed therethrough. The second sealing portion includes a sealing surface, an opposing face, and an aperture formed therethrough. The hinge includes a first hinge surface and a second hinge surface. The hinge may be provided in a first configuration, wherein the first hinge surface is coplanar with the sealing surface of the first sealing portion and the sealing surface of the second sealing portion, and the second hinge surface is recessed from the opposing surface of the first sealing portion and the opposing surface of the second sealing portion. Alternatively, the first hinge face may be recessed from the sealing surface of the first sealing portion and the sealing surface of the second sealing portion, and the second hinge surface may be coplanar with the opposing surface of the first sealing portion and the opposing surface of the second sealing portion. In another configuration, both the first hinge surface and the second hinge surface may be recessed from the sealing surface of the first sealing portion and the sealing surface of the second sealing portion, as well as the opposing surface of the first sealing portion and the opposing surface of the second sealing portion.

In yet another embodiment of the disclosure, a method of providing a seal to a HVAC system is provided. The method includes the step of providing an HVAC system having a thermal expansion valve and at least one refrigerant conduit. A seal is then provided, the seal having a first sealing portion having an aperture formed therethrough, and a second sealing portion having a valve aperture formed therethrough. The first sealing portion of the seal and the thermal expansion valve are then installed on the refrigerant conduit, and the second sealing portion of the seal is folded over the thermal expansion valve wherein a portion of the thermal expansion valve is received in the valve aperture.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

FIG. 4 is an exploded perspective view of a thermal expansion valve and seal of FIG. 1.

FIG. 5 is a partially exploded perspective view of a thermal expansion valve and seal of FIG. 1, wherein the seal is partially assembled with the thermal expansion valve.

FIG. 6 is a partially exploded perspective view of a thermal expansion valve and seal of FIG. 1, wherein the seal is partially assembled with the thermal expansion valve.

FIG. 7 is a perspective view of the thermal expansion valve of FIG. 4, wherein the seal is fully assembled with the thermal expansion valve.

FIG. 8 is a side elevational view of the thermal expansion valve and the seal of FIG. 7.

DETAILED DESCRIPTION OF EXEMPLARY EMBODIMENTS OF THE INVENTION

The following description of technology is merely exemplary in nature of the subject matter, manufacture and use of the invention, and is not intended to limit the scope, application, or uses of the invention claimed in this application or in such other applications as may be filed claiming priority to this application, or patents issuing therefrom. Regarding the methods disclosed, the order of the steps presented is exemplary in nature, and thus, the order of the steps can be different in various embodiments. Except in the examples, or where otherwise expressly indicated, all numerical quantities in this description are to be understood as modified by the word "about" in describing the broadest scope of the technology.

Figure 1:
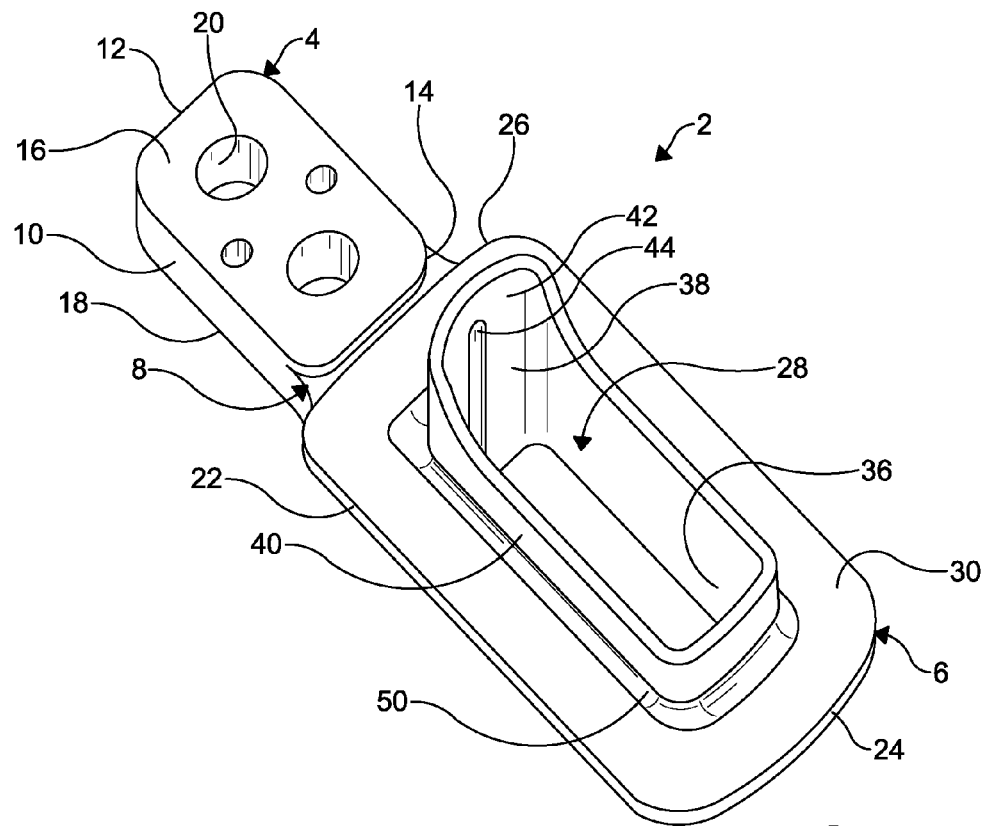
FIG. 1 is a perspective view of a seal according to an embodiment of the disclosure.
Figure 2:
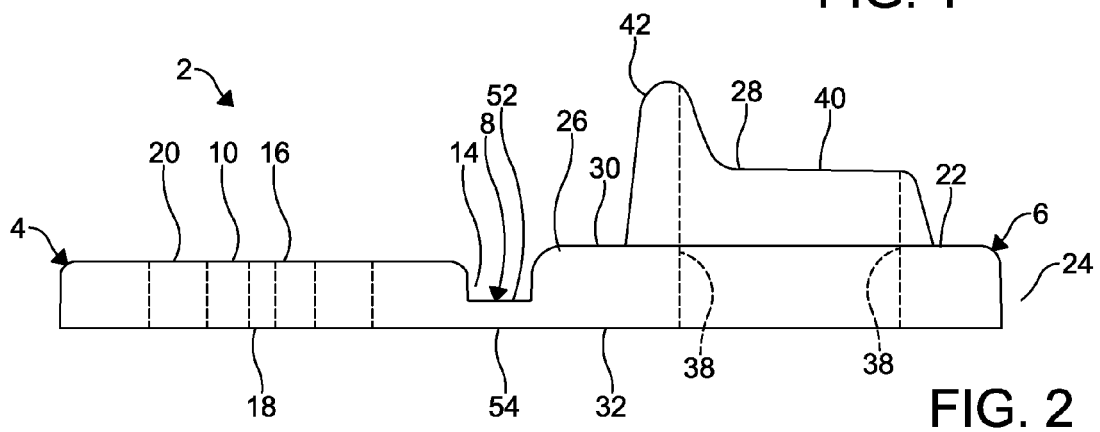
FIG. 2 is a side elevational view of the seal of FIG. 1.
Figure 3:
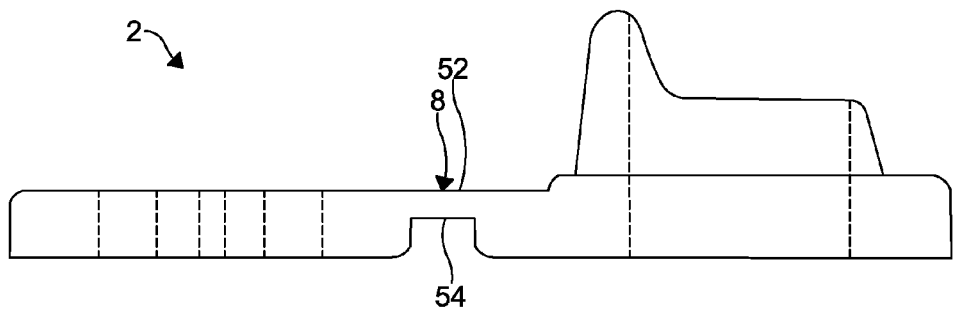
FIG. 3 is a side elevational view of a seal according to another embodiment of the disclosure.

FIGS. 1-3 illustrate a seal 2 according to one embodiment of the instant disclosure. The seal 2 includes a first sealing portion 4, a second sealing portion 6, and a hinge 8 disposed intermediate the first sealing portion 4 and the second sealing portion 6. The seal 2 may be formed of at least one pliable and resilient molded material such as a cellular polymeric material, a pure rubber material, a blended rubber material, a polyurethane foam, an EPDM foam, and a nitrile-butadiene rubber, for example.

In the embodiment shown, the first sealing portion 4 is a substantially planar first body 10 having a free end 12 and a second end 14. The first body 10 further includes a sealing surface 16 and an opposing surface 18 defining a thickness of the first body 10 therebetween. The first sealing portion 4 may be formed of a first material and a second material, wherein the sealing surface 16 may be formed of a material different from the material of the first body 10. For example, the first body 10 may be formed of a cellular polymeric material, and the sealing surface 16 may be formed of a pure rubber material. Alternatively, the first body 10 may be formed of a first cellular polymeric material, and the sealing surface 16 may be formed of a second cellular polymeric material. Other combinations of materials for the first body 10 and sealing surface 16 using the disclosed materials will be apparent to a skilled artisan.

Apertures 20 are disposed through the first body 10. The apertures 20 may be cylindrical in shape. As illustrated, the first sealing portion 4 includes two apertures 20, but it should be appreciated that any number of the apertures 20 may be included, as desired.

The second sealing portion 6 includes a substantially planar second body 22 having a free end 24, a second end 26, and a valve aperture 28 formed therein. The second body 22 further includes a sealing surface 30 and an opposing surface 32 defining a thickness of the second sealing portion 6 therebetween. The valve aperture 28 spans the thickness of the second sealing portion 6 and has a transverse cross section configured to sealingly receive therein a thermal expansion valve 34 (shown in FIGS. 4-8) having a substantially similar profile. For example, the valve aperture 28 of the illustrated embodiment is formed by a pair of opposing sidewalls 36 and a pair of end walls 38, together having a substantially rectangular cross section, and is configured to receive the thermal expansion valve 34 having a substantially rectangular cross sectional shape.

A flange 40 projects outwardly from the second sealing surface, and circumscribes the valve aperture 28. The valve aperture 28 and the flange 40 may have common sidewalls 36 and end walls 38, wherein the flange 40 has a transverse cross section substantially similar to the valve aperture 28. The flange 40 may further include a hood 42 formed integrally therein. The hood 42 of the embodiment shown is integral with one of the end walls 38 of the flange 40, and protrudes beyond the opposing end wall 38 and sidewalls 36 of the flange 40. An interior of the hood 42 may include a channel 44 formed therein, wherein the channel 44 extends from the surface 32, and terminates at an intermediate portion of the interior wall of the hood 42. The hood 42 is configured to receive a diaphragm 46 of the thermal expansion valve 34 therein. In the embodiment shown, the hood 42 is semi-disc shaped to accommodate a protruding portion of the diaphragm 46 of the thermal expansion valve 34.

The second sealing portion 6 may further include a relief 50 disposed about a perimeter of the flange 40, wherein the relief 50 is formed in the sealing surface 30 and extends to a depth intermediate the sealing surface 30 and the surface 32. A thin-walled portion is formed between the base of the relief 50 and the surface 32, providing the flange 40 with increased flexibility to allow the flange 40 to be more easily fitted to the thermal expansion valve 34.

The hinge 8 is disposed intermediate the first sealing portion 4 and the second sealing portion 6. The hinge 8 is formed between the second end 14 of the first sealing portion 4 and the second end 26 of the second sealing portion 6. The hinge 8 includes a first hinge surface 52 and a second hinge surface 54 spaced apart a distance and defining a thickness of the hinge 8 therebetween. The thickness of the hinge 8 is less than the thicknesses of the first sealing portion 4 and the second sealing portion 6. In the embodiment of FIG. 2, the first hinge surface 52 is recessed a distance from the sealing surface 16 of the first sealing portion 4 and the sealing surface 30 of the second sealing portion 6, while the second hinge surface 54 is coplanar with the surface 18 of the first sealing portion 4 and the surface 32 of the second sealing portion 6. In the embodiment of FIG. 3, the first hinge surface 52 is coplanar with the sealing surface 16 of the first sealing portion 4 and the sealing surface 30 of the second sealing portion 6, while the second hinge surface 54 is recessed a distance from the surfaces 18 of the first sealing portion 4 and the surface 32 of the second sealing portion 6. In another embodiment, both the first hinge surface 52 and the second hinge surface 54 may be recessed a distance from the sealing surface 16 and the surface 18 of the first sealing portion 4 and sealing surface 30 and surface 32 of the second sealing portion 6, as shown in FIGS. 2 and 3.

The seal 2 is configurable in an unfolded position and in a folded position. In the unfolded position, the first sealing portion 4, the second sealing portion 6, and the hinge 8 are substantially aligned along a common plane, as shown in FIGS. 1-6. When configured in the folded position, the first sealing portion 4 overlaps the second sealing portion 6, wherein the surface 18 and surface 32 are adjacent each other, as shown in FIGS. 7 and 8.

FIGS. 4-8 illustrate an embodiment of the seal 2 as assembled with the thermal expansion valve 34 of an HVAC system. FIG. 4 shows an exploded view of the seal 2 and the thermal expansion valve 34, including an at least one refrigerant conduit 56. As illustrated, the diaphragm 46 is disposed on a top surface of the thermal expansion valve 34, and is substantially disk shaped. The diaphragm 46 may include a boss 48 disposed on an upper surface thereof. An at least one port 58 is formed in the thermal expansion valve 34, and is configured to receive the at least one refrigerant conduit 56 therein. In the embodiment shown, the thermal expansion valve 34 includes a pair of ports 58 and a corresponding pair of refrigerant conduits 56.

As shown in FIG. 5, the seal 2 is first provided in an unfolded state, wherein the first sealing portion 4 and the second sealing portion 6 are substantially aligned, and do not overlap. Assembly first includes first installing the first sealing portion 4 of the seal 2 onto the at least one refrigerant conduit 56, wherein the at least one refrigerant conduit 56 is received in the apertures 20 of the first sealing portion 4 through the sealing surface 16 and extends beyond the surface 18 of the first sealing portion 4. The sealing surface 16 is then disposed adjacent a sealing surface 60 of the HVAC system to create a fluid tight seal therebetween. The fluid tight seal militates against a flow of fluid into the passenger compartment of a vehicle.

Upon installation of the first sealing portion 4 onto the at least one refrigerant conduit 56, the thermal expansion valve 34 is disposed adjacent the first sealing portion 4 on the at least one refrigerant conduit 56, wherein the at least one refrigerant conduit 56 is received in the at least one corresponding port 58 of the thermal expansion valve 34, as shown in FIG. 6.

Subsequently, as shown in FIGS. 7 and 8, the seal 2 is folded along the hinge 8 wherein the second sealing portion 6 is positioned adjacent the first sealing portion 4 and receives a portion of the thermal expansion valve 34 within the valve aperture 28. The flange 40 of the second sealing portion 6 at least partially encompasses the outer walls of the thermal expansion valve 34. The diaphragm 46 of the thermal expansion valve 34 is received in the hood 42 of the flange 40, wherein the diaphragm 46 is substantially contained within the hood 42 of the flange 40 to provide sufficient thermal insulation between the diaphragm 46 and a surrounding environment. The boss 48 of the diaphragm 46 may be received in the channel 44 of the hood 42.

The seal 2 of the disclosed embodiment provides an improvement over thermal expansion valve seals known in the art. One exemplary advantage of the disclosed seal 2 is the reduction of manufacturing costs. By forming the first sealing portion 4 and the second sealing portion 6 in an integral part, the need for manufacturing a separate first sealing portion 4 and second sealing portion 6 is eliminated. This provides the added benefit of reduced costs in manufacturing, installation, and maintaining inventory.

The seal 2 of the instant disclosure provides the advantageous effect of improved performance over seals known in the art. The seal 2 of the instant disclosure is capable of both mitigating against passage of fluids into the passenger compartment and providing thermal insulation to the diaphragm 46 of the thermal expansion valve 34.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A seal for an HVAC system comprising:
    a first sealing portion having an aperture formed therethrough;
    a second sealing portion having an aperture formed therethrough; and
    a hinge disposed intermediate the first sealing portion and the second sealing portion,
    wherein the seal is configurable in an unfolded position and in folded position, wherein in the unfolded position the first sealing portion, the second sealing portion, and the hinge are substantially aligned, and in the folded position the second seal portion overlaps the first seal portion, wherein the second sealing portion includes a flange circumscribing the aperture, and wherein the second sealing portion includes a hood protruding beyond the flange and is configured to receive a diaphragm of a thermal expansion valve therein.

2. The seal of claim 1, wherein the aperture of the second sealing portion is a valve aperture configured to receive the thermal expansion valve therein.

3. The seal of claim 1, wherein the seal is formed of at least one of a cellular polymer material, a pure rubber material, a blended rubber material, an EPDM foam, a polyurethane foam, and a nitrile-butadiene rubber.

4. The seal of claim 1, wherein the seal is formed of a first material and a second material, wherein the first material is different from the second material.

5. A seal for an HVAC system comprising:
   a first sealing portion having a sealing surface, an opposing surface, and an aperture formed therethrough;
   a second sealing portion having a sealing surface, an opposing surface, and an aperture formed therethrough; and
   a hinge disposed intermediate the first sealing portion and the second sealing portion, the hinge having a first hinge surface and a second hinge surface, wherein the second sealing portion includes a flange having a hood formed integrally therein, and wherein the flange circumscribes the aperture of the second sealing portion and protrudes from the second face, the hood of the flange protruding beyond the flange and configured to receive a diaphragm of a thermal expansion valve therein.

6. The seal of claim 5, wherein the first hinge surface is recessed from the sealing surface of the first sealing portion and the sealing surface of the second sealing portion, and the second hinge surface is coplanar with at least one of the opposing surface of the first sealing portion and the opposing surface of the second sealing portion.

7. The seal of claim 5, wherein the first hinge surface is coplanar with the sealing surface of the first sealing portion and sealing surface of the second sealing portion, and the second hinge surface is recessed from at least one of the opposing surface of the first sealing portion and the opposing surface of the second sealing portion.

8. The seal of claim 5, wherein the first hinge surface is recessed from the sealing surface of the first sealing portion and sealing surface of the second sealing portion, and the second hinge surface is recessed from at least one of the opposing surface of the first sealing portion and the opposing surface of the second sealing portion.

9. The seal of claim 5, wherein the seal is formed of at least one of a cellular polymeric material, a pure rubber material, a blended rubber material, an EPDM foam, a polyurethane foam, and a nitrile-butadiene rubber.

\* \* \* \* \*